Figure 1:
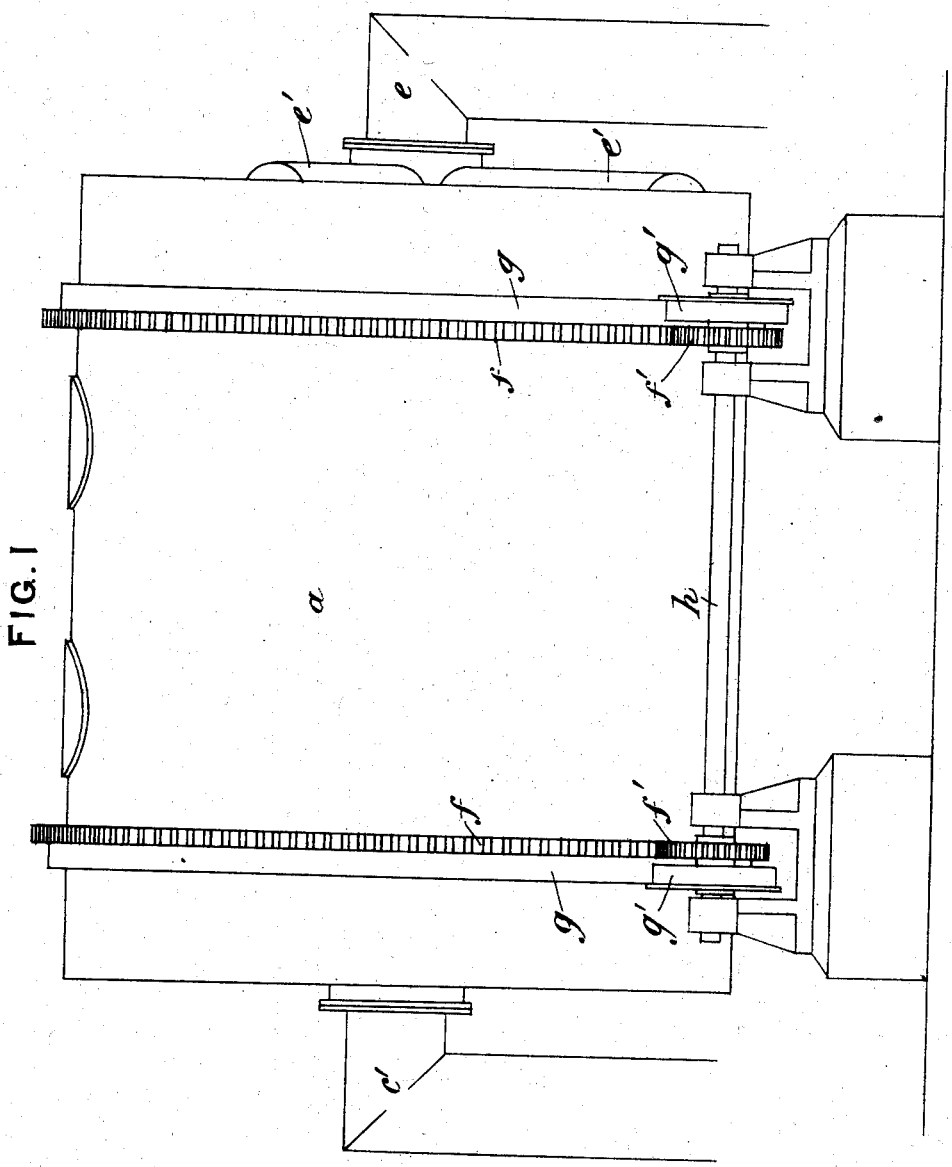

No. 706,462. Patented Aug. 5, 1902.
J. SLEEMAN.
APPARATUS FOR MALTING, DRYING, OR OTHERWISE TREATING GRAIN.
(Application filed Dec. 24, 1898.)
(No Model.) 7 Sheets—Sheet 2.

Witnesses.

Inventor.
James Sleeman.
By James L. Norris
Atty.

No. 706,462. Patented Aug. 5, 1902.
J. SLEEMAN.
APPARATUS FOR MALTING, DRYING, OR OTHERWISE TREATING GRAIN.
(Application filed Dec. 24, 1898.)
(No Model.) 7 Sheets—Sheet 3.
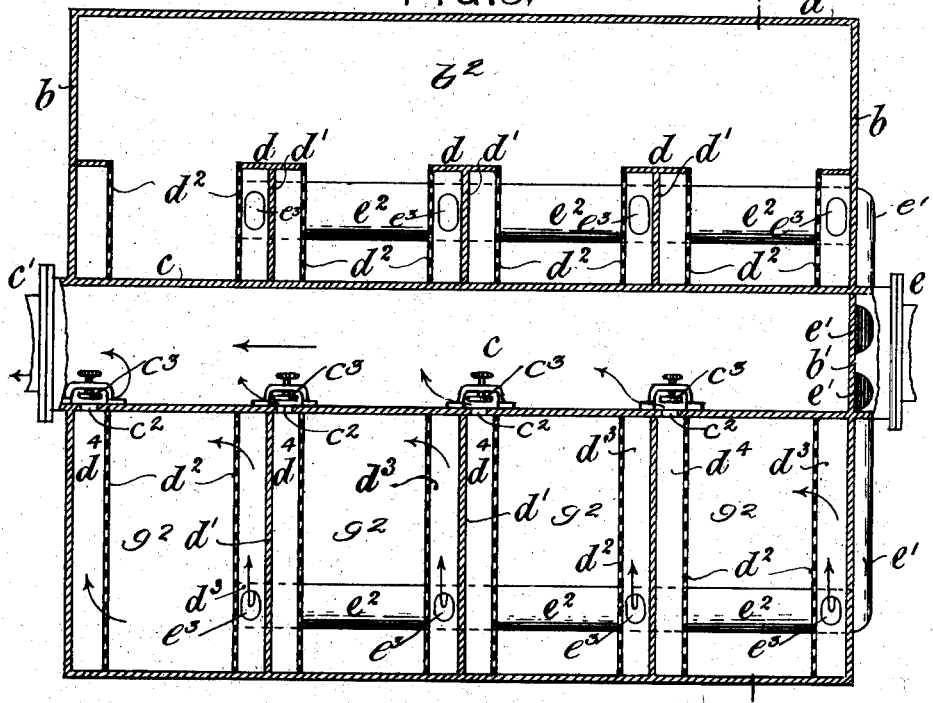
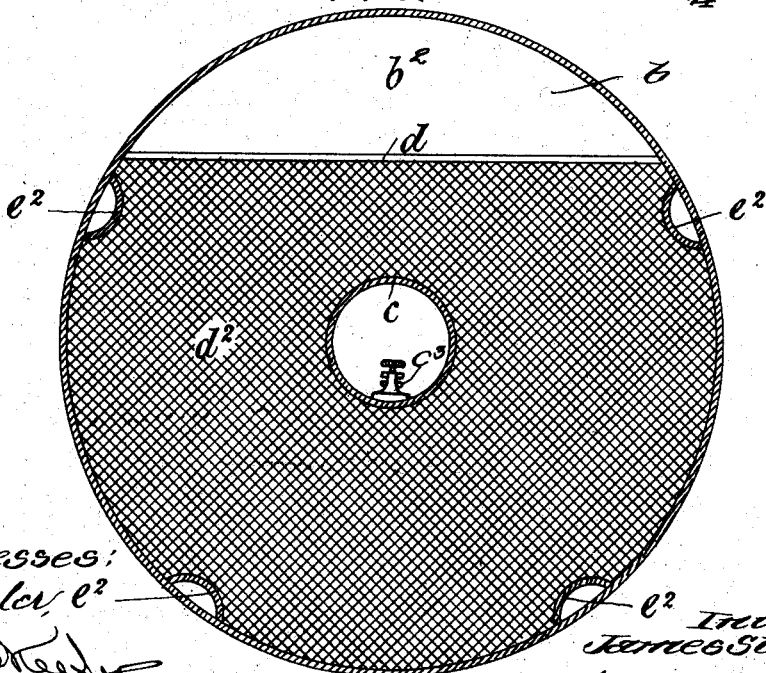

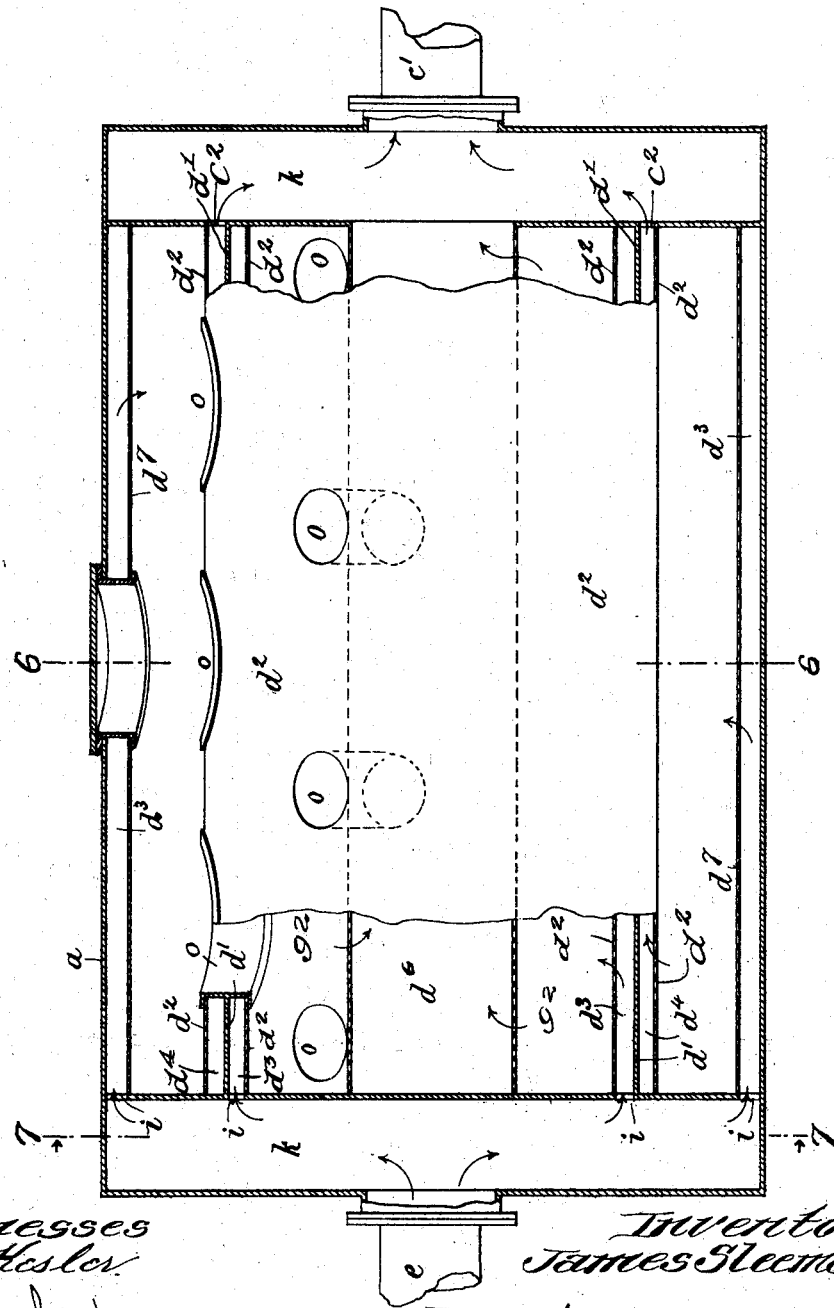

No. 706,462. Patented Aug. 5, 1902.
J. SLEEMAN.
APPARATUS FOR MALTING, DRYING, OR OTHERWISE TREATING GRAIN.
(Application filed Dec. 24, 1898.)
(No Model.) 7 Sheets—Sheet 5.

Witnesses
Inventor
James Sleeman
By James L. Norris
Atty

No. 706,462. Patented Aug. 5, 1902.
J. SLEEMAN.
APPARATUS FOR MALTING, DRYING, OR OTHERWISE TREATING GRAIN.
(Application filed Dec. 24, 1898.)
(No Model.) 7 Sheets—Sheet 6.

Witnesses: Inventor
James Sleeman
By James L. Norris
Atty.

No. 706,462. Patented Aug. 5, 1902.
J. SLEEMAN.
APPARATUS FOR MALTING, DRYING, OR OTHERWISE TREATING GRAIN.
(Application filed Dec. 24, 1898.)
(No Model.) 7 Sheets—Sheet 7.

UNITED STATES PATENT OFFICE.

JAMES SLEEMAN, OF SOMERSET, ENGLAND.

APPARATUS FOR MALTING, DRYING, OR OTHERWISE TREATING GRAIN.

SPECIFICATION forming part of Letters Patent No. 706,462, dated August 5, 1902.

Application filed December 24, 1898. Serial No. 700,285. (No model.)

*To all whom it may concern:*

Be it known that I, JAMES SLEEMAN, maltster, a subject of the Queen of Great Britain, residing at Carlton House, Portishead, Somerset, England, have invented certain new and useful Improvements in Apparatus for Malting, Drying, or Otherwise Treating Grain, of which the following is a specification.

The object of my invention is to provide a novel apparatus for effecting improvements in malting, drying, and otherwise treating grain and the like whereby superior results are obtained and economy in power, fuel, space, time, and labor is insured.

According to my invention I effect a more thorough and even treatment of the grain by the use of the apparatus hereinafter described, all of the various processes being controllable at will. The supply of even temperatures and aeration without waste or excess enables me to obtain a malt (without exhaustion of the grain) plumper and sounder and giving a higher extract than can be attained by any apparatus now in use.

I make use of a vessel preferably of a cylindrical shape, the shell of which is impervious to air and the interior being divided into a number of compartments, whereby the bulk of grain is divided into sections, the sections or partitions being constructed as supply and exhaust ways alternately. The connections with the supply and exhaust ways are so arranged that the air or other fluid is compelled to pass through the grain in order to reach the exhaust, suitable valves being provided to regulate the flow, and the space above said partitions acting as a mixing-chamber when the vessel is rotated.

In order that my said invention may be particularly described and ascertained, reference is hereby made to the accompanying drawings, in which similar letters of reference indicate corresponding parts.

Figure 2:
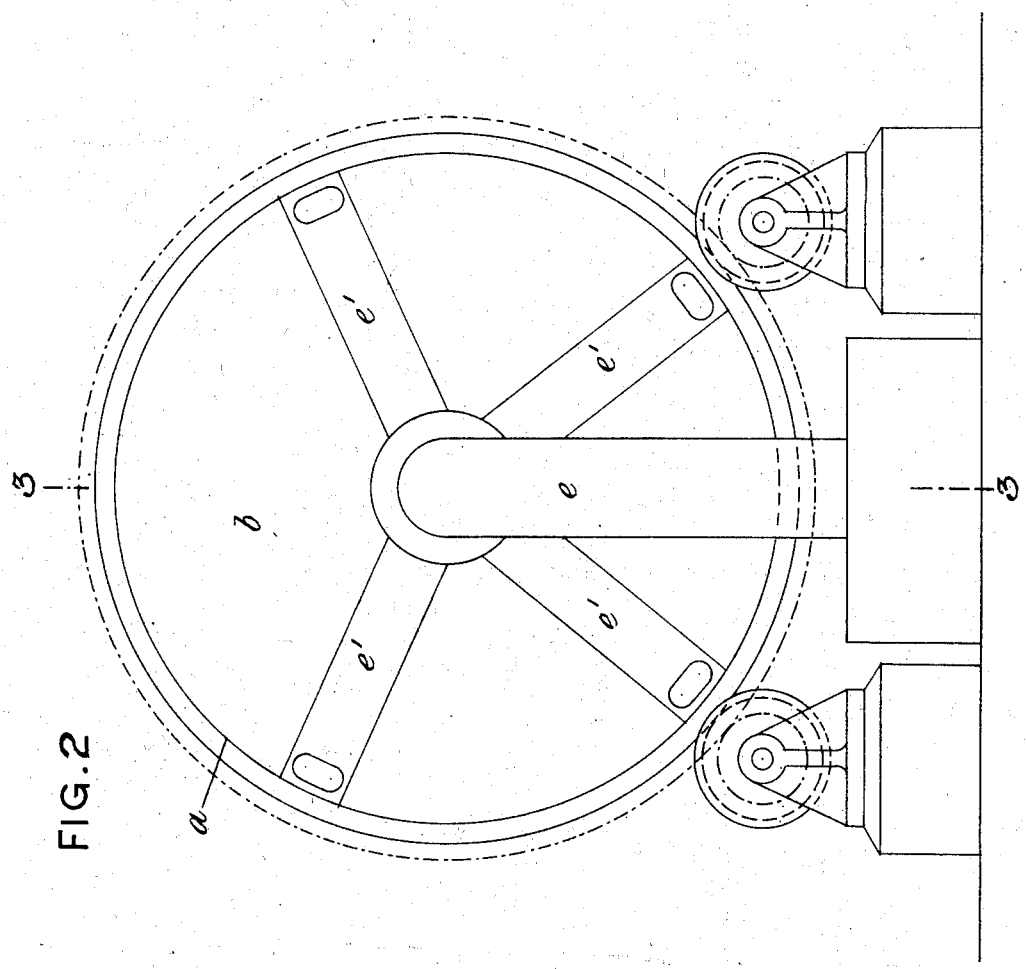
Figure 6:
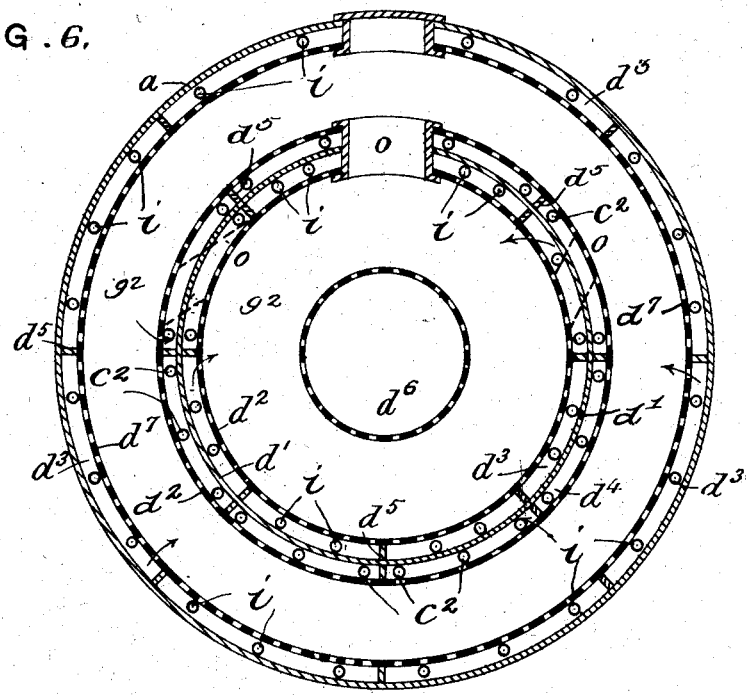
Figure 7:
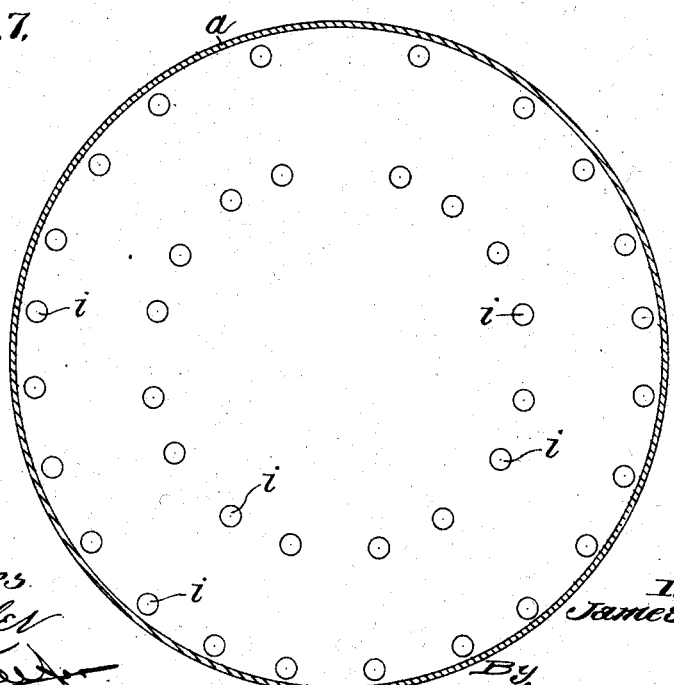
Figure 8:
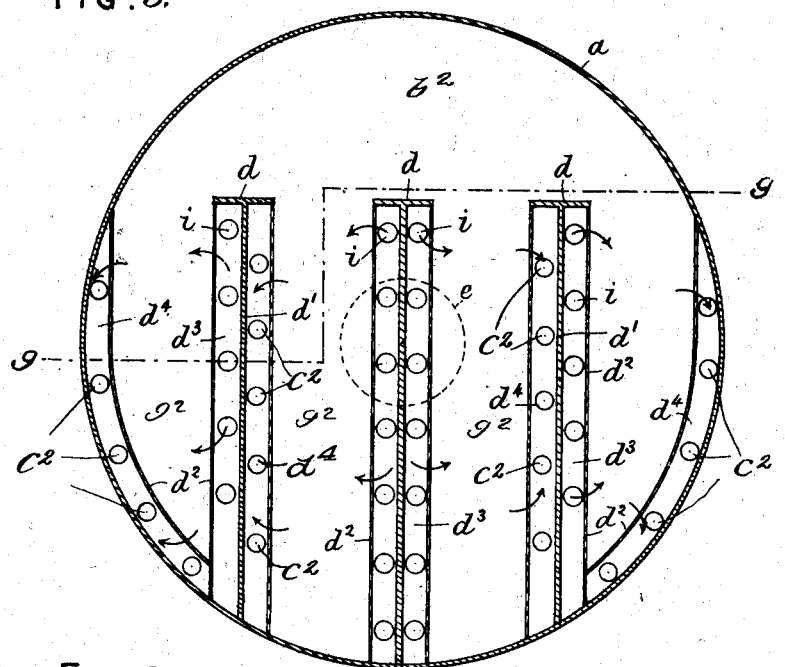
Figure 9:
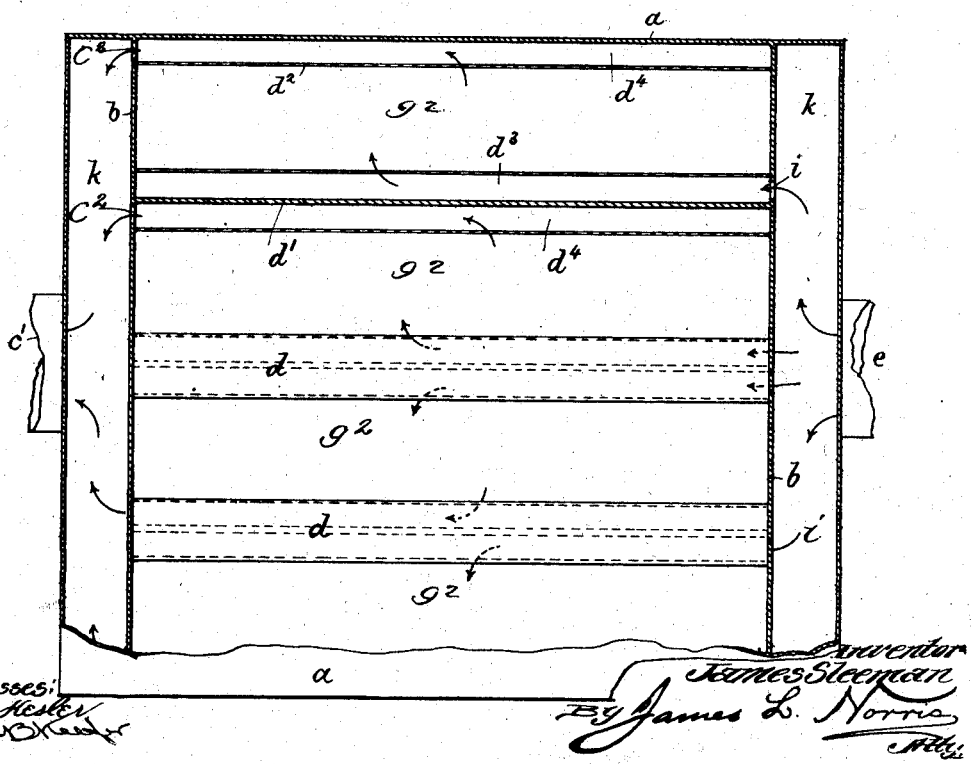
Figure 10:
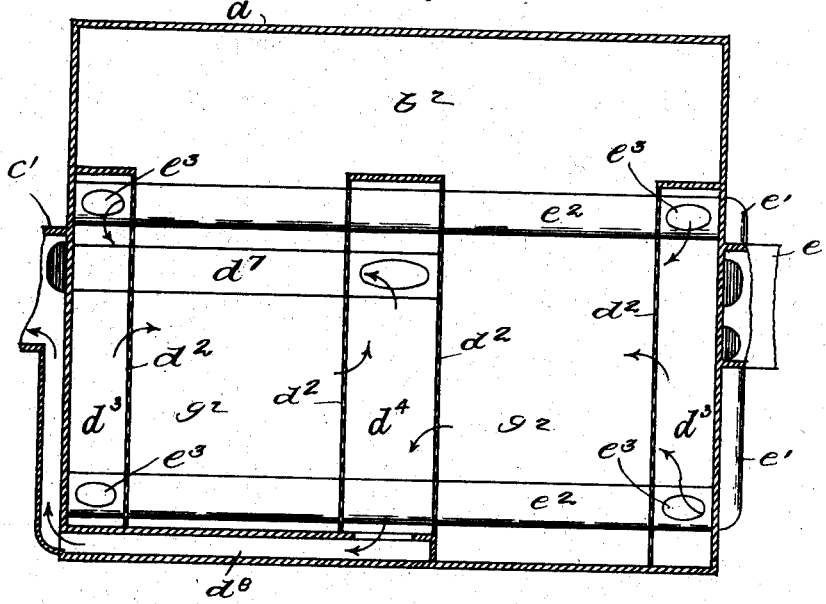
Figure 11:

Figure 1 is a side elevation of a cylindrical vessel constructed according to my invention. Fig. 2 is an end elevation of the same. Fig. 3 is a section on the line 3 3 of Fig. 2. Fig. 4 is a section on the line 4 4 of Fig. 3. Fig. 5 is a side view, partly in section and partly in elevation, of a modified construction of apparatus, certain parts being also broken away to better illustrate the construction. Fig. 6 is a section on the line 6 6 of Fig. 5. Fig. 7 is a section on the line 7 7 of Fig. 5. Fig. 8 is a transverse section through another modified construction of apparatus. Fig. 9 is a section on the line 9 9 of Fig. 8. Fig. 10 is a longitudinal sectional view illustrating a form of the apparatus in which the division-walls are omitted, and Fig. 11 is a detail sectional view illustrating the manner of securing the removable caps or coverings in place.

Referring to Figs. 1, 2, 3, and 4, $a$ is a cylinder fitted with ends $b$ and a central tube $c$. Inside the cylinder a number of hollow partitions $d$ are fitted, each of which consists of a central division $d'$ and two walls $d^2$, of perforated metal or gauze. Also at each end of the cylinder a chamber is fitted having a perforated metal or gauze wall $d^2$. The spaces between the partitions $d$ constitute grain-compartments $g^2$. Each alternate chamber $d^3$ is connected with the air or other fluid supply trunk $e$ by branch ducts $e'$ $e^2$ through the medium of openings $e^3$, and each other chamber $d^4$ is connected with the exhaust-tube $c$ and trunk $c'$, as shown in Fig. 3, by means of an opening $c^2$, which may be closed by means of a valve $c^3$. It will therefore be seen that the space between the partitions being filled with malt or grain the supply of air from $c'$ can only reach the exhaust-tube $c$ by passing through the grain, each section being similarly and simultaneously treated. In other words, the air must pass in each instance from the opening $e^3$ in duct $e^2$ into the chamber $d^3$, whence it passes through the grain in the compartment $g^2$, then into the chamber $d^4$ and out through the opening $c^2$ into the exhaust-tube $c$. $f f$, Fig. 1, are toothed rings, and $g g$ are rail-rings, the former driven by pinions $f' f'$ fast on the axle $h$, and the latter being upon the wheels or rollers $g'$ $g'$, also fixed to the axle $h$, the axle being rotated as desired by any suitable means. The trunks $e$ and $c'$ are fitted to the central tube $c$, so as to allow the tube and cylinder to revolve and yet be as air-tight as possible. The tube $c$ is stopped at one end at $b'$, as shown at Fig. 3. The partitions $d$ are considerably shorter in one direction than the diameter of the cylinder—that is to say, in the position of the parts shown in Figs. 3 and 4 they do not extend to the top of said cylinder, a space $b^2$ being provided above these partitions which communicates with all of the grain-compartments and is for the purpose of permitting the grain to fall out of the grain-compartments and be mixed when the cylinder is rotated. This space $b^2$ is herein referred to as the "mixing-chamber." Above the partitions $d$ a space $b^2$ is provided, extending throughout the length of the cylinder $a$ and communicating with all of the grain-compartments $g^2$. This space serves as a mixing-chamber into which the grain may fall from the various grain-compartments as the cylinder is revolved.

Figs. 5, 6, and 7 show a cylinder provided with a concentric hollow cylindrical partition and a central tube, thereby providing circular grain-compartments $g^2$. Said partition is made up of two perforated cylinders $d^2$ and a central division, not perforated, $d'$. These and the perforated cylinder $d^2$, fixed to the cylindrical shell, are stayed internally by webs or stays $d^5$, which serve also to divide the air or fluid passages, so as to enable certain of them to be closed at will. The webs or stays $d^5$ extend from end to end of the drum and from side to side of the perforated cylinders $d^2$, as shown. They therefore divide the annular chambers formed by the cylinders $d^2$ into sections, each of which has openings $i$, communicating either with the supply or the exhaust end space. Thus if the openings of one section are closed this section is closed against the air supply or exhaust, as the case may be. Also throughways $o$, analogous to the space or mixing-chamber $b^2$, above the partitions $d$ of Figs. 3 and 4, are fitted to allow the grain in the several concentric chambers $g^2$ to mix together. The central tube $d^6$ is also of perforated metal or gauze suitably stayed, having one end closed, as described with reference to Figs. 1 to 4. Also, as before described, each air-chamber $d^3$ is connected with the supply-trunk, and each other chamber $d^4$ and the tube $d^6$ are connected with the exhaust-trunk. In no case in any of the devices is any one chamber connected with both the supply and exhaust trunks. In the arrangement shown in Fig. 5 an end space $k$ is provided at each end of the cylinder similar to that shown in Fig. 8, to be hereinafter described, Fig. 7 being a transverse section through the left-hand or supply-end space. In this figure a number of inlets $i$ are provided, connecting the chambers $d^3$ with the air-supply, the end space acting as a reservoir or air-supply chamber. Those inlets which are situated above the malt-level are closed during aeration or germination, so as to economize the air. In the use of this apparatus the air will enter the end space $k$ from the air-supply pipe $e$ and passing through the openings $i$ will enter the respective annular chambers $d^3$. From these chambers the air will pass through the foraminous material into the respective concentric grain-compartments $g^2$, aerating the grain therein, and from the outermost compartment $g^2$ it will pass into the chamber $d^4$ and out through the opening $c^2$ into the end space $k$ at the opposite end of the apparatus, while the air from the innermost chamber $d^3$ will pass through the innermost compartment $g^2$, and thence through the foraminous material or tube $d^6$ into the end space $k$ at the opposite end of the apparatus from that first described, and all of the air passing through the apparatus will escape through the pipe $c'$.

Figs. 8 and 9 show a cylinder provided with vertical longitudinal hollow partitions. In this case also two end spaces $k$ are shown fitted to the cylinder, one for supply and the other for exhaust. The principle of the air or other fluid chambers is similar to those already described—that is to say, the air enters, as before, from the pipe $e$ into the end space $k$, as shown at the right hand of Fig. 9, and passing through the openings $i$ it enters the various chambers $d^3$, whence it passes through the forminous material into and through the compartments $g^2$ into the chambers $d^4$ and escapes through the openings $c^2$. The arrows indicate the direction of the air or other fluid currents, or vice versa.

Fig. 10 is another modification in which the cylinder is divided into two compartments by an exhaust-way $d^4$, with perforated sides $d^2$, the air-supply being from the two end chambers, as shown by the arrows, or vice versa. Exhaust-ducts $d^7 d^8$ lead from the exhaust-way $d^4$ to the exhaust-trunk $c'$. In this case the air enters through the openings $e^3$ into the chambers $d^3$ at each end of the apparatus, and passing through the grain-compartments $g^2$ it enters the chamber $d^4$, only one of these chambers being provided in the present form of the apparatus, and from this chamber the air escapes through the ducts $d^7$ and $d^8$ to the exhaust-pipe $c'$.

In order to economize the air and to insure it passing through the grain, I provide movable caps or coverings, as shown in section in Fig. 11, which represents the upper portion of two hollow partitions with the cap or covering $l$ in position upon the malt $m$. The cap or covering $l$ may be made of india-rubber or other suitable flexible material, or it may be made up of a number of metal sections and is sometimes held in position or weighted, as shown, by a frame $n$ to resist the pressure of the air-supply. As the grain grows and the bulk expands the covers are raised to accommodate the expansion and are removed when washing or steeping and when the cylinder is to be rotated.

Although I have described the apparatus as of the form of a cylindrical vessel of circular section, I do not confine myself to this shape, as a square or other polygonal shape may be employed, the essential feature of my invention being a rotatable vessel the interior of which is divided into a compartment or compartments for grain by hollow perforated partitions (constructed with or without a division-wall impervious to air) or two perforated walls and an upper mixing space or chamber, the air or other fluid chambers being connected with the supply and exhaust in such a manner that the only way between the supply and exhaust chambers is through the grain. Thus when the drum or vessel is inverted or rotated the grain falls into the top space and the variation or difference in the dimensions causes the grain to disperse or distribute in such a manner that the cakes or rings are completely broken up and the grain thoroughly separated and turned.

The method of working is as follows: Water is admitted to the cylinder and then the grain to be malted, the air-valves having been closed. The cylinder is rotated, whereby the grain is washed and cleansed and the dirty water discharged. Fresh clean water is then admitted (as often as desired) and the grain allowed to steep or soak. The water is drawn off, the air-valves opened, and germination or growing is commenced. Fresh pure air is forced into and withdrawn from the cylinder, the air passing completely and evenly through the grain and being withdrawn in a vitiated state through the exhaust ways and trunks. This aeration is continued with occasional rotations of the vessel until the grain is sufficiently germinated, when the malt is ready for malting. The kilning may be effected in ordinary kilns used for the purpose, or it may be effected in a cylinder. In the latter case the supply-trunk is connected with a hot-air furnace and the hot air forced through and drawn from the malt in a similar manner to the aerating by fresh air.

By my improved apparatus I am enabled to obtain the necessary perfect control over air-currents, whereby the germination of the malt is more easily and perfectly effected than by any other means at present in use. Also the germination-malt can be kept at the desired temperature without the necessity of an excessive quantity of air, which is especially important during the withering process. Similarly a more even kilning is obtainable, the malt being cured without scorching at a higher temperature than by any other process or means. The space above the partitions $d$, Figs. 3, 4, 8, and 10, and the throughways $o$, Fig. 5, causes the malt to thoroughly separate during rotation.

Having thus fully described my invention, what I claim as new, and desire to secure by Letters Patent, is—

1. An apparatus for malting and otherwise treating grain, comprising a rotatable vessel, one portion of which is formed with a grain-compartment having perforated walls and the remaining portion being formed larger than and communicating with said grain-compartment and constituting a mixing-chamber, and an air inlet and exhaust communicating with said grain-compartment, substantially as set forth.

2. An apparatus for malting and otherwise treating grain, comprising a rotatable vessel, a hollow partition, or a series of hollow partitions having perforated walls and dividing said vessel into a number of communicating grain-compartments, and air inlet and exhaust pipes, said hollow partitions being alternately arranged in communication with said inlet and exhaust pipes, respectively, substantially as described.

3. An apparatus for malting and otherwise treating grain, comprising a rotatable vessel, a series of hollow partitions having perforated walls, dividing said vessel into a number of grain-compartments, each of said partitions having a segment or portion thereof, removed to afford a space communicating with all of said compartments, a series of imperforate walls dividing each of said hollow partitions into two chambers, and air inlet and exhaust pipes, said chambers being alternately arranged in communication with said inlet and exhaust pipes, substantially as described.

4. An apparatus for malting and otherwise treating grain, comprising a suitable vessel, a series of hollow partitions having perforated walls and dividing said vessel into a number of communicating grain-compartments, a supply-pipe and a series of air-ducts leading therefrom, and a central exhaust-tube, said hollow partitions being alternately arranged in communication with said air-ducts and said exhaust-tube, respectively, substantially as described.

5. An apparatus for malting and otherwise treating grain comprising a suitable vessel, a series of hollow upright partitions having perforated walls and dividing said vessel into a series of grain-compartments, removable caps or covers supported by adjacent partitions and closing said grain-compartments, and air inlet and exhaust pipes, said hollow partitions being alternately arranged in communication with said inlet and exhaust pipes, respectively, substantially as described.

In testimony whereof I have hereunto set my hand in presence of two subscribing witnesses.

JAMES SLEEMAN.

Witnesses:
GEORGE C. DOWNING,
W. M. HARRIS.